United States Patent
Hodjat et al.

(10) Patent No.: US 7,055,243 B2
(45) Date of Patent: Jun. 6, 2006

(54) CRANKSHAFT DAMPER WITH INTEGRAL PULSE RING AND METHOD

(75) Inventors: Yahya Hodjat, Oxford, MI (US); Marc Cadarette, London (CA); John Roes, Strathroy (CA); Don Wilson, Strathroy (CA)

(73) Assignee: The Gates Corporation, Denver, CO (US)

( * ) Notice: Subject to any disclaimer, the term of this patent is extended or adjusted under 35 U.S.C. 154(b) by 105 days.

(21) Appl. No.: 10/970,159

(22) Filed: Oct. 21, 2004

(65) Prior Publication Data

US 2005/0050727 A1    Mar. 10, 2005

Related U.S. Application Data

(62) Division of application No. 10/209,346, filed on Jul. 30, 2002.

(60) Provisional application No. 60/310,034, filed on Aug. 3, 2001.

(51) Int. Cl.
*B21K 1/42* (2006.01)
*B21H 1/00* (2006.01)

(52) U.S. Cl. .................. 29/892.11; 29/892.3; 474/94; 474/178; 74/574.4; 72/82

(58) Field of Classification Search ............. 29/892.1, 29/892.11, 892.2, 892.3; 474/94, 178, 903; 74/574.4; 72/82, 84
See application file for complete search history.

(56) References Cited

U.S. PATENT DOCUMENTS

| | | | |
|---|---|---|---|
| 3,280,654 A | 10/1966 | Arnt, Jr. ...................... 74/574 |
| 4,848,183 A | 7/1989 | Ferguson ..................... 74/574 |
| 5,203,223 A | 4/1993 | Himmeroeder .............. 74/449 |
| 5,236,115 A | 8/1993 | Pape .......................... 228/170 |
| 5,237,744 A | 8/1993 | Himmeroeder .......... 29/893.32 |
| 5,299,468 A | 4/1994 | Withers ....................... 74/574 |
| 5,404,640 A | 4/1995 | Himmeroeder .......... 29/893.32 |
| 5,596,153 A | 1/1997 | Bulgrien et al. ....... 73/862.326 |
| 5,651,181 A * | 7/1997 | Shohara et al. ............ 29/892.3 |
| 5,966,996 A | 10/1999 | Hamaekers .................. 74/574 |
| 5,987,952 A | 11/1999 | Kutzscher et al. ............. 72/71 |
| 5,988,015 A | 11/1999 | Riu ............................... 74/574 |
| 6,026,709 A | 2/2000 | Depp et al. ............... 74/573 F |
| 6,691,542 B1 * | 2/2004 | Fukukawa et al. ............. 72/84 |

FOREIGN PATENT DOCUMENTS

| DE | 4426529 | * | 2/1996 |
|---|---|---|---|
| DE | 43 25 509 A1 | | 10/1999 |
| EP | 907039 | * | 4/1999 |
| EP | 947670 | * | 10/1999 |

* cited by examiner

*Primary Examiner*—Eric Compton
(74) *Attorney, Agent, or Firm*—J.A. Thurnau, Esq.; C.H. Castleman, Esq.; J.I. Mahurin, Esq.

(57) ABSTRACT

The invention comprises a crankshaft damper having an integral pulse ring. The crankshaft damper comprises an inner hub and outer pulley with an elastomeric connecting member between each. The elastomeric ring dampens a crankshaft vibration. The integral pulse ring is manufactured as part of the inner hub by flow forming a sheet metal blank.

6 Claims, 8 Drawing Sheets

CRANKSHAFT DAMPER WITH INTEGRAL PULSE RING AND METHOD

REFERENCE TO RELATED APPLICATIONS

This application claims priority from U.S. provisional application Ser. No. 60/310,034 filed Aug. 3, 2001 and is a divisional of U.S. non-provisional application Ser. No. 10/209,346 filed Jul. 30, 2002.

FIELD OF THE INVENTION

The invention relates to crankshaft dampers and more particularly to crankshaft dampers having an integral pulse ring and a method of making same.

BACKGROUND OF THE INVENTION

Reciprocating internal combustion engines generally comprise, among other things, a crankshaft for power output. Engine accessory components are driven by a belt connected to a pulley on one end of the crankshaft. During operation the crankshaft vibrates in various modes due to the reciprocating nature of the engine. Such vibration can adversely affect operation and long-term reliability. Consequently, viscoelastic dampers may be incorporated into crankshaft pulleys to damp crankshaft vibration. Such combinations of pulley and viscoelastic damper are simply referred to as "crankshaft dampers". The crankshaft damper generally comprises an inner hub and an outer pulley. The outer pulley is generally attached to the inner hub by a viscoelastic elastomeric ring.

In certain applications crankshaft dampers may include a pulse ring or timing gear for engine ignition timing. The pulse ring rotates in front of a sensor attached to the engine. The pulse ring generally includes a gap as a reference point, for example, to indicate TDC for cylinder one. The pulse ring is generally attached to the crankshaft damper outer pulley. However, due to the vibration and relative motion, albeit small, of the hub to the pulley made possible by the elastomer ring, accurately detecting the pulse ring location on the outer pulley can be adversely affected. Consequently, for very precise applications, the pulse ring is attached to the inner hub, which is then rigidly assembled to the crankshaft. However, prior art pulse rings comprise a separate part that must be press fit, welded or otherwise attached using other means to the inner hub.

Representative of the art is U.S. Pat. No. 5,203,223 (1993) to Himmeroeder that discloses a cold-former gear made from a single circular sheet of sheet metal.

Also representative of the art is U.S. Pat. No. 5,966,996 (1999) to Hamaekers that discloses an annular machine part comprising at least two metal machine elements which are separated from each other by a viscoelastic layer. A separately produced extension piece projects from one of the machine elements.

Also representative of the art is a crankshaft damper manufactured by Freudenberg NOK having an inner hub and an outer ring joined by an elastomeric ring. A pulse ring is press fit into the inner hub.

The prior art pulse rings are not integral to the inner hub making them subject to detaching from the inner hub or damper.

What is needed is a crankshaft damper having an integral pulse ring. What is needed is a crankshaft damper having an integral pulse ring whereby the integral pulse ring is flow formed on an inner hub. The present invention meets these needs.

SUMMARY OF THE INVENTION

It is a feature of the invention to provide a crankshaft damper having an integral pulse ring.

Another feature of the invention is to provide a crankshaft damper having an integral pulse ring whereby the integral pulse ring is flow formed on an inner hub.

Other aspects of the invention will be pointed out or made obvious by the following description of the invention and the accompanying drawings.

The invention comprises an improved crankshaft damper having an integral pulse ring. The crankshaft damper comprises an inner hub and outer pulley with an elastomeric connecting member between each. The elastomeric member dampens a crankshaft vibration. The integral pulse ring is manufactured as part of the inner hub by flow forming a sheet metal blank.

BRIEF DESCRIPTION OF THE DRAWINGS

The accompanying drawings that are incorporated in and form a part of the specification illustrate preferred embodiments of the present invention, and together with a description, serve to explain the principles of the invention.

DETAILED DESCRIPTION OF THE PREFERRED EMBODIMENT

The improvements of the inventive damper over the prior art are many fold. The inventive damper allows much better timing accuracy to be achieved using the flow formed integral pulse ring as opposed to two separate parts as in the prior art. This significantly improves the accuracy of the location of the pulse ring relative to the inner hub and the pulley, both radially and laterally. This in turn improves the accuracy of determining the position of the crankshaft for timing purposes. Further, a more accurate gap dimension for containing the connecting member is achieved between the ring and the pulley; as is better run out and concentricity. The inventive damper is also stronger than the prior art construction. The inventive pulse ring is not subject to detaching from the inner hub as in the prior art. With respect to fabrication, the inventive damper has fewer pieces requiring fewer assembly operations as compared to the prior art.

Since the inventive damper is flow formed the quality of the pulse ring is superior to that of the manufactured pulse rings of the prior art.

Figure 1:
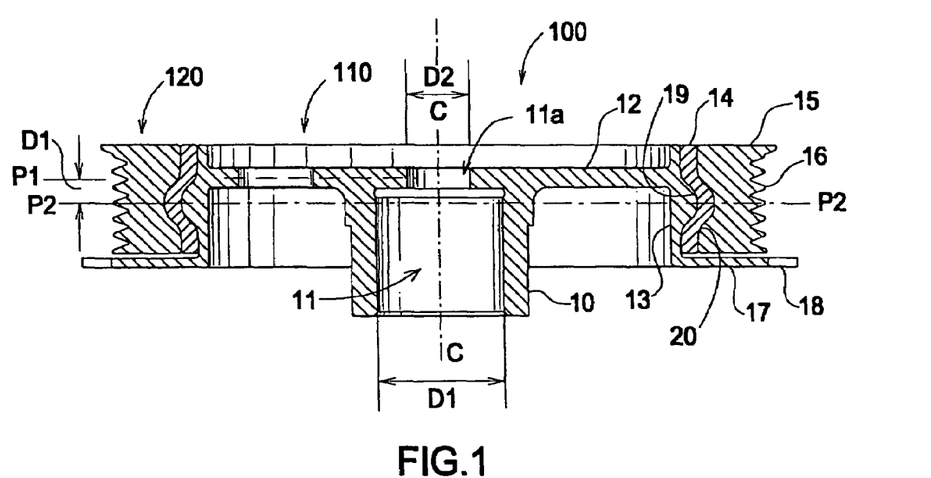
FIG. 1 is a cross-sectional view of the inventive crankshaft damper.

FIG. 1 is a cross-sectional view of the inventive crankshaft damper. The inventive crankshaft damper 100 is formed of metallic material and comprises an inner member or hub 110 and outer member or ring 120. Flexible connecting member 14 is fit between inner hub 110 and outer ring 120. In the preferred embodiment connecting member 14 comprises a viscoelastic, elastomeric ring. Elastomeric ring 14 may comprise, but be not limited to SBR, NBR, HNBR, EPDM, VAMAC, EVM and blends of the above.

Inner hub 110 comprises center hub 10. Center hub 10 comprises bore 11 into which a crankshaft (not shown) is inserted. Inner hub 110 also comprises web 12 to which interface ring 13 is formed. Line C—C is a centerline of the inventive damper as well as an axis of rotation. C—C aligns with a crankshaft centerline (not shown). C—C is also depicted in FIG. 2, FIGS. 4a–4g, FIGS. 5a–5d, FIGS. 8a–8j and FIGS. 9a–9c.

Pulse ring 17 is flow formed integrally with inner hub 110. Pulse ring 17 extends substantially normal to an axis of rotation, C—C, of the inventive damper. An outer perimeter of pulse ring 17 comprises tabs or teeth 18. Teeth 18 extend radially from pulse ring 17. In operation, when the inventive damper is rotating on a crankshaft, teeth 18 are detected by a sensor on an engine (not shown) for engine ignition timing.

Outer ring 120 comprises pulley 15. Pulley 15 is engaged with inner hub 110 by connecting member 14. In this embodiment outer ring 120 is cast in a fashion known in the art. Outer interface ring surface 19, connecting member 14 and pulley inner surface 20 may have any suitable profile, including that of an arcuate curve. Surface 19 and surface 20 and member 14 may have other cooperating profiles as may be required by a user, including nodes and undulations. Surface 19 and surface 20 otherwise have a substantially cylindrical form into which the noted profiles are incorporated, see FIG. 3. Pulley 15 comprises a belt bearing surface having a multi-ribbed profile 16. The belt bearing surface 16 may also have a toothed profile or a v-belt profile.

Plane P1 of web 12 is offset distance D1 from a belt bearing surface plane P2—P2. This cantilever construction allows belt bearing surface 16 to be recessed toward an engine thereby requiring less clearance space in front of an engine.

Figure 2:
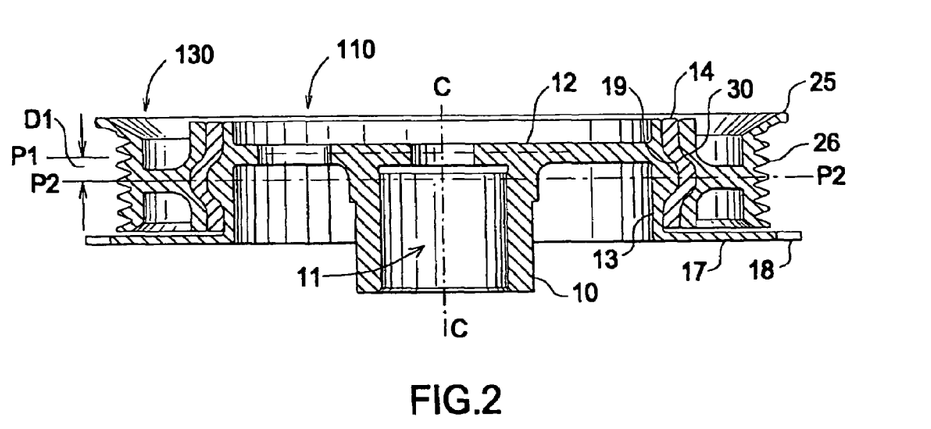
FIG. 2 is a cross-sectional view of the inventive crankshaft damper.

FIG. 2 is a cross-sectional view of the inventive crankshaft damper. Outer ring 130 comprising pulley 25 is spun or flow formed in this embodiment in a fashion known in the art. Belt bearing surface 26 has a multi-ribbed profile and is spun or flow formed into the pulley 25 outer surface. The belt bearing surface 16 may also have a toothed profile or a v-belt profile. Surface 30 cooperates with surface 19. All other components are as described in FIG. 1.

Plane P1 of web 12 is offset distance D1 from a belt bearing surface plane P2—P2. This cantilever construction allows belt bearing surface 26 to be recessed toward an engine thereby requiring less clearance space in front of an engine.

Figure 3:
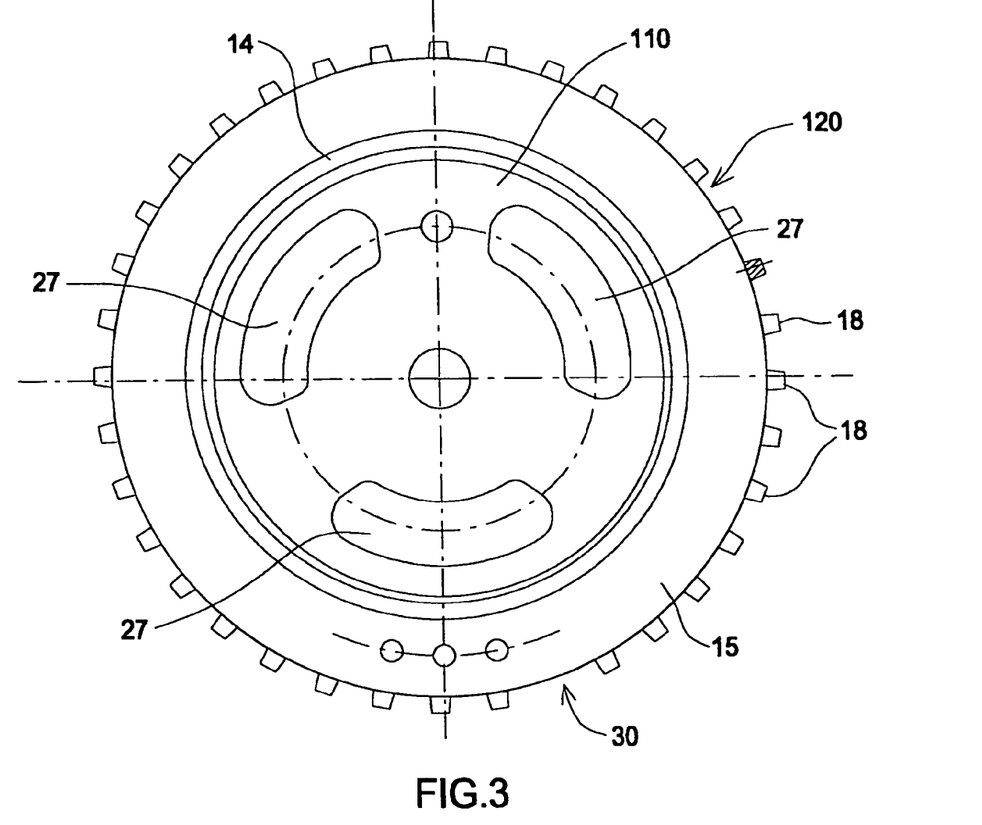
FIG. 3 is a front elevation view of the inventive crankshaft damper.

FIG. 3 is a front elevation view of the inventive crankshaft damper. Teeth 18 extend about a perimeter of pulse ring 17. Outer ring 120 is engaged with inner hub 110 by member 14. A timing means or gap 30 in teeth 18 comprises a timing reference point between teeth 18 to be detected by a sensor (not shown). Gap 30 may comprise any form of discontinuity in teeth 18 that may be detected by a sensor. Teeth 18 extend beyond an outer perimeter of profile 16.

Figure 4A:
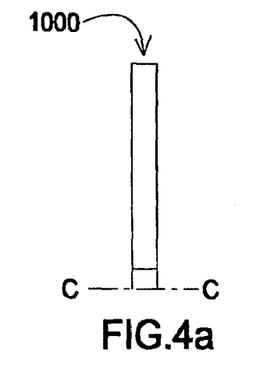
FIGS. 4a, 4b, 4c, 4d, 4e, 4f, 4g are half cross-sectional views of a fabrication sequence.

FIGS. 4a, 4b, 4c, 4d, 4e, 4f, 4g are half cross-sectional views along axis C—C of a fabrication sequence. FIG. 4a depicts a blanking step. Sheet metal blank 1000 is stamped or cut in a known fashion into a circular form. It is then mounted in a rotating mandrel.

Figure 4B:
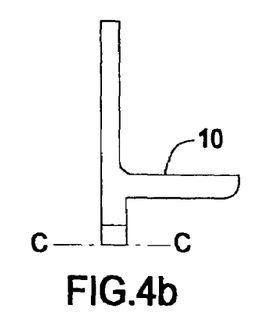
Figure 7A:
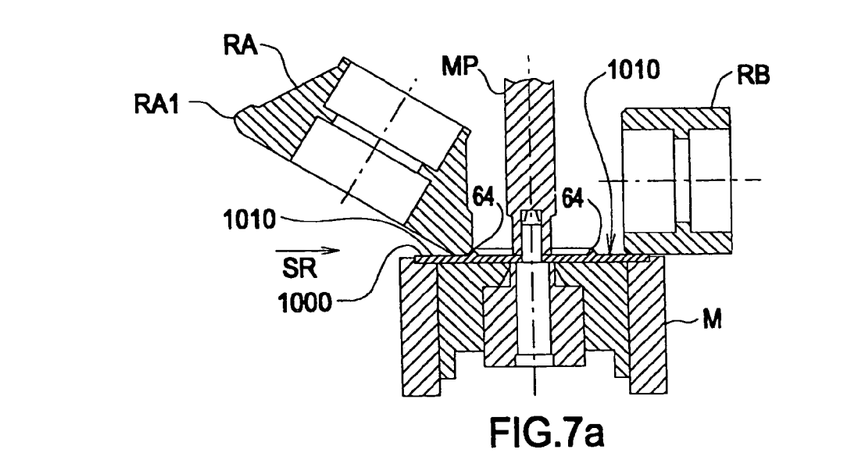
FIGS. 7a, 7b, 7c are cross-sectional views of the formation of a hub having a closed bore.
Figure 7B:
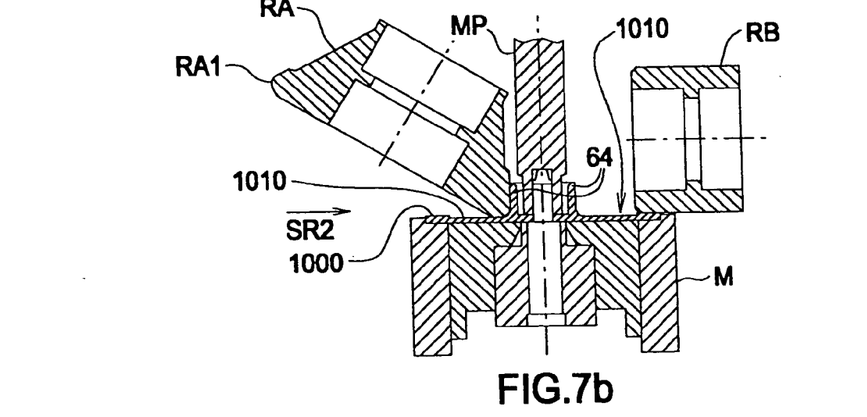
Figure 7C:
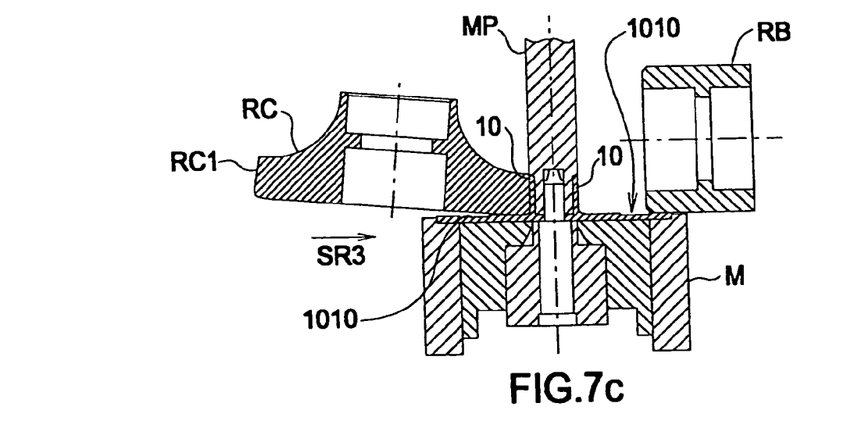

FIG. 4b shows the closed bore center hub 10 as spun by processes know in the art, including the method disclosed in U.S. Pat. No. 5,987,952 to Kutzscher et al. incorporated herein by reference in its entirety. FIGS. 7a, 7b, 7c are cross-sectional views of the formation of a hub having a closed or blind bore. Referring to FIG. 7a, the hub is formed by spinning annular disc or blank 1000 supported by rotating mandrel M. Roller RA having forming profile RA1 is moved radially inwardly in direction SR against a side 1010 of blank 1000, thereby displacing a portion 64 of blank 1000 inwardly against a mandrel to form hub 10. Roller RB holds an outer perimeter of blank 1000 in place against mandrel M during the forming process. Roller RB rolls on blank 1000 and mandrel M as mandrel M rotates. FIG. 7b shows the further progression of roller RA in direction SR2 thereby moving portion 64 inward toward mandrel post MP. FIG. 7c shows the fully formed hub 10. In FIG. 7c, roller RC is shown applying the final shape top hub 10. Roller RC has a different forming profile RC1 than that of roller RA in order to properly form the cylindrical shape of finished hub 10.

Bore 11 is a blind or closed bore in that diameter D1 is greater than diameter D2, see FIG. 1. A fastener (not shown) such as a bolt may then be inserted through hole 11a to fasten the inventive damper to a shaft (not shown). The inventive damper may also instead use a hub not having a blind bore, using a key to secure the damper to a crankshaft (not shown). The described methods of fastening the damper to a shaft are intended as examples and are not meant to limit the manner in which the damper may be fastened to a shaft.

Figure 4C:
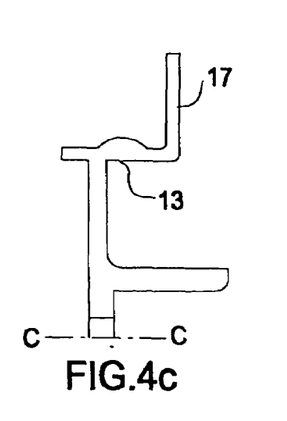

FIG. 4c shows formation of the interface ring 13 and pulse ring 17. This process is further described in FIGS. 5a through 5d.

Figure 4D:
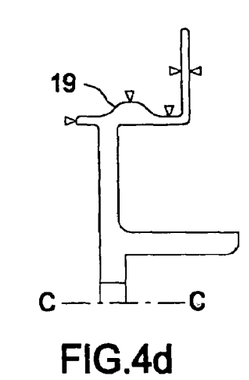

FIG. 4d shows machining performed on the formed surfaces as known the art. The rubber interface surface 19 is machined to a predetermined finish for proper engagement with the elastomeric member 14. A suitable surface finish may also be applied by known processes, such as by painting or coating with epoxy.

Figure 4E:
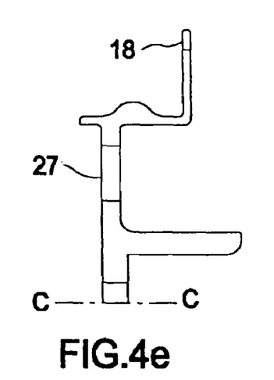

FIG. 4e shows the piercing step. Teeth 18 and web openings 27, see FIG. 3, are formed by piercing. Piercing includes any known stamping process by which metal is removed from the inner hub 110 to from web openings 27 and from the pulse ring 17 to form teeth 18. Teeth 18 may also be spun or flow formed in a known fashion.

Figure 4F:
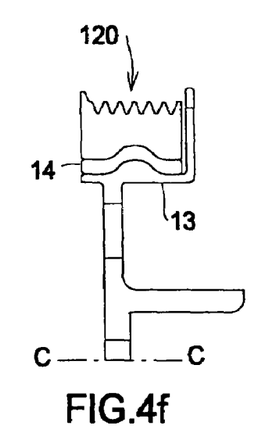

FIG. 4f shows outer ring 120 engaged to interface ring 13 with the connecting member elastomeric ring 14. In this step outer ring 120 and inner hub 110 are held in relative fixed positions. Member 14 is then pressed between ring 120 and hub 110. Member 14 is in a somewhat compressed state between the inner hub and outer ring, in a range of approximately >0% to approximately 50% compression of a thickness, in order to facilitate engagement of member 14 with outer ring 120 and inner hub 110. An adhesive may be used in a known fashion to secure member 14 between the inner hub 110 and outer ring 120.

Figure 4G:
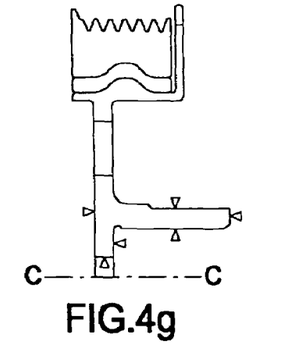
Figure 5A:
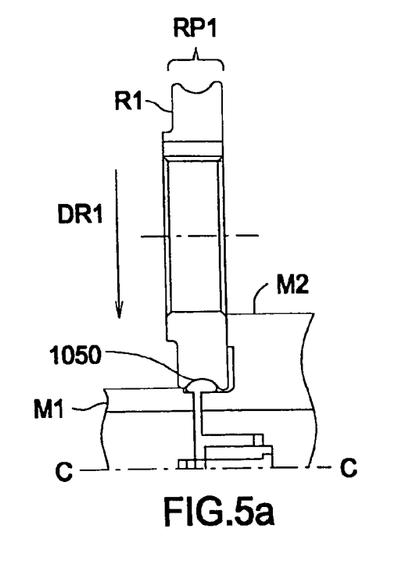
FIGS. 5a, 5b, 5c, 5d are half cross-sectional views of a fabrication process.
Figure 5B:
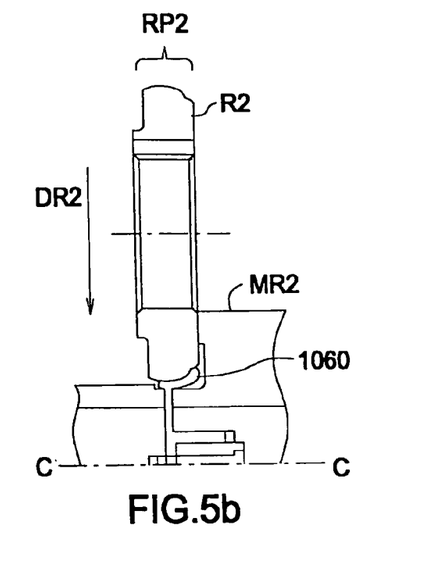
Figure 5C:
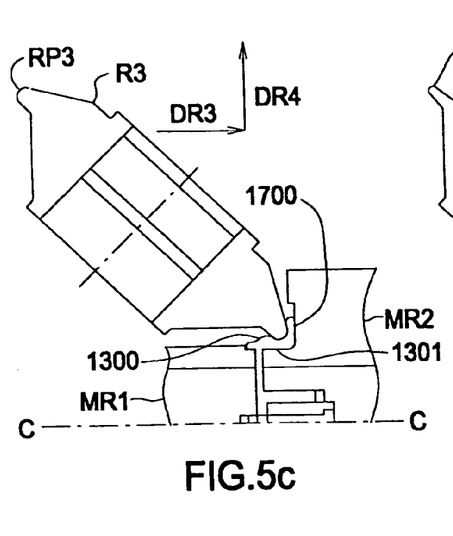
Figure 5D:
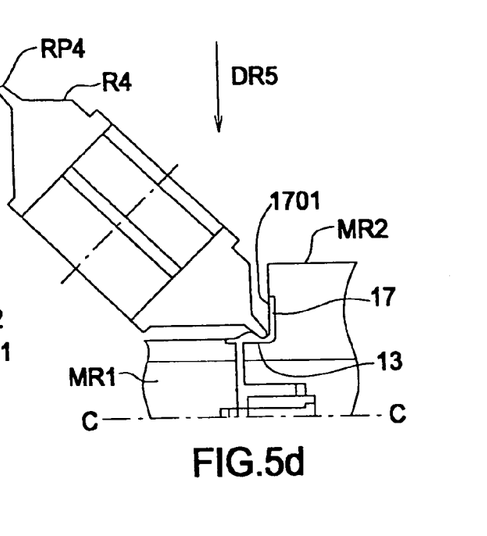

FIG. 4g shows a final machining step to complete the center hub 10 in a fashion known in the art. This may include application of a predetermined surface finish by machining, painting or coating.

FIGS. 5a, 5b, 5c, 5d are half cross-sectional views along axis C—C of a fabrication process. The form shown in FIG. 4b is further formed by a roller R1 having forming profile RP1 moving radially inward in direction DR1 to form a gathered portion 1050 of blank 1000. Gathered portion 1050 is accumulated against mandrel section M1 and M2. Gathered portion 1050 is then split by roller R2 having rolling profile RP2 moving radially inwardly in direction DR2 while portion 1050 is simultaneously spread to form lobe 1060, see FIG. 5b. Lobe 1060 is collected against mandrel section M2. Next, lobe 1060 is stretched by roller R3 moving in direction DR3 and then in direction DR4. Roller R3 having rolling profile RP3 further forms lobe 1060 into the rough shape of the interface ring 1300 and pulse ring 1700 against mandrel section MR2, see FIG. 5c. An inner surface 1301 of lobe 1060 is supported by a mandrel section MR2 during the stretching step in FIG. 5c. Next, final stretch forming using roller R4 having rolling profile RP4 gives the final shape to interface ring 13 and pulse ring 17, including surface 19, see FIG. 4d. Roller R4 moves in direction DR5 to form a flat surface 1701 for pulse ring 17, thereby forming the final radially extending member shape of ring 17, see FIG. 5d.

Figure 6:
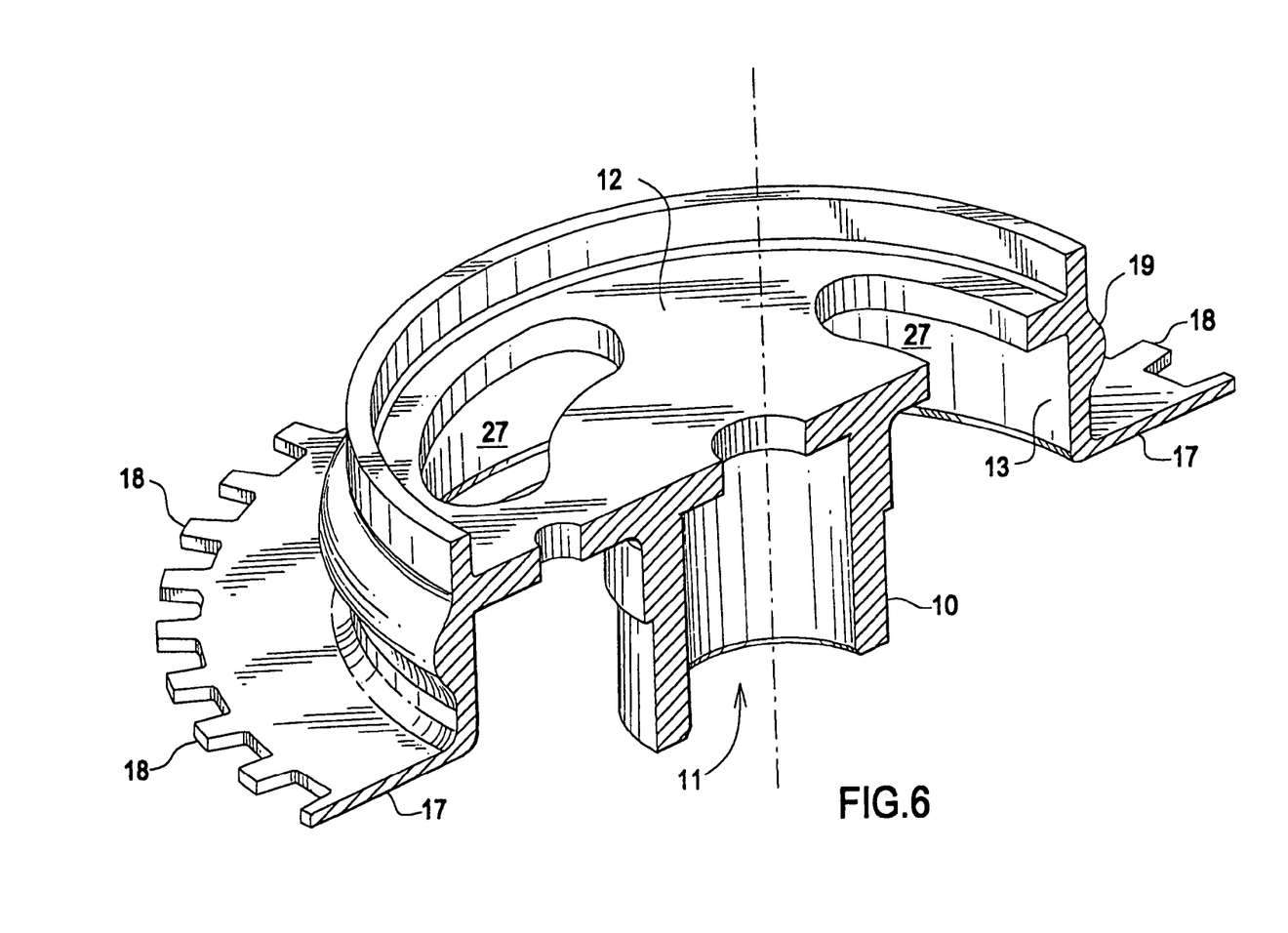
FIG. 6 is a cross-sectional perspective view of the inner hub of the inventive damper.

FIG. 6 is a cross-sectional perspective view of the inner hub of the inventive damper. Inner hub 110 comprises center hub 10. Center hub 10 comprises bore 11 into which a crankshaft (not shown) may be inserted. Inner hub 110 also comprises web 12 to which interface ring 13 is formed. Pulse ring 17 is formed integrally with inner hub 110 as described herein. An outer perimeter of pulse ring 17 comprises tabs or teeth 18. In operation, teeth 18 as well as gap 30 are detected by a sensor on an engine (not shown).

Figure 8A:
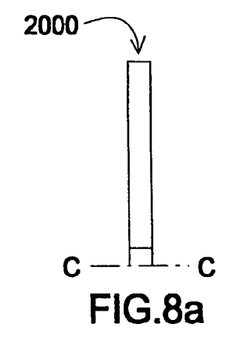
FIGS. 8a, 8b, 8c, 8d, 8e, 8f, 8g, 8h, 8i, 8j are half cross-sectional views of a fabrication sequence.

FIGS. 8a, 8b, 8c, 8d, 8e, 8f, 8g, 8h, 8i, 8j are half cross-sectional views along axis C—C of a fabrication sequence. FIG. 8a depicts a blanking step. Sheet metal blank 2000 is stamped or cut in a known fashion into a circular form. It is then mounted in a rotating mandrel.

Figure 8B:
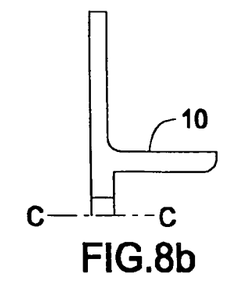

FIG. 8b shows the closed bore center hub 10 as spun by processes know in the art, including the method disclosed in U.S. Pat. No. 5,987,952 to Kutzscher et al. incorporated herein by reference in its entirety. FIGS. 7a, 7b, 7c are cross-sectional views of the formation of a hub having a closed or blind bore as described elsewhere herein.

Figure 8C:
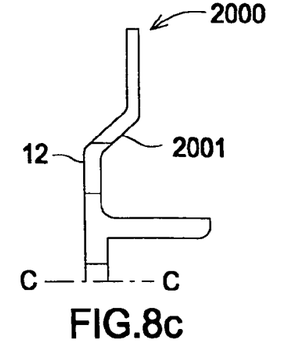

FIG. 8c shows press forming of the partially formed disc. Offset 2001 is pressed by known processes into the damper web 12.

Figure 8D:
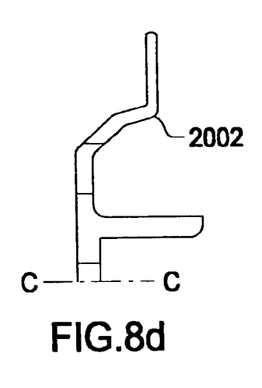
Figure 8E:
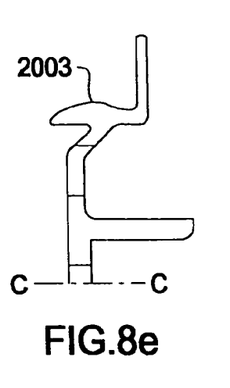
Figure 8F:
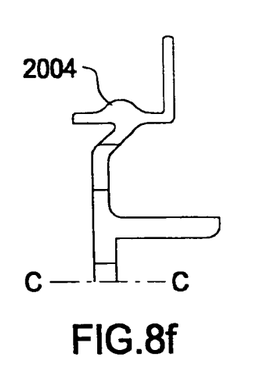
Figure 9A:
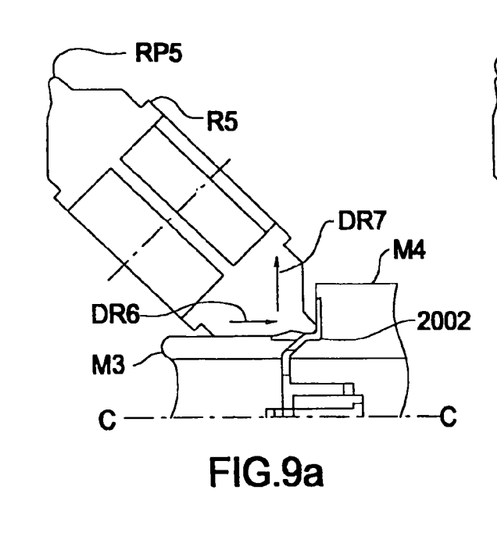
FIGS. 9a, 9b, 9c are half cross-sectional views of a fabrication process.
Figure 9B:
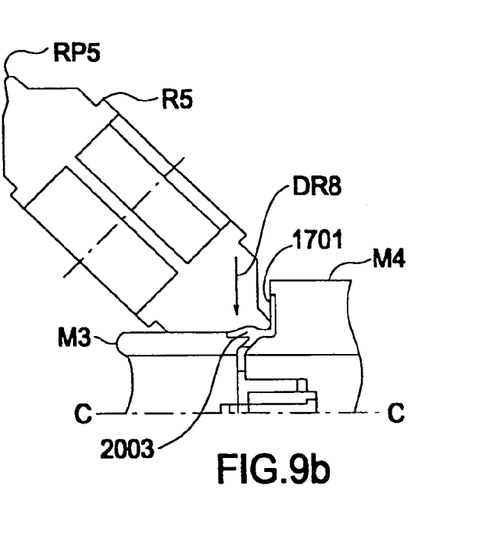
Figure 9C:
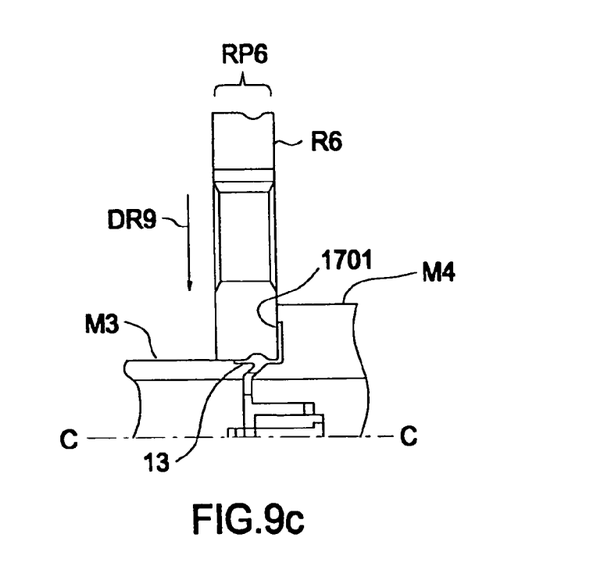

FIGS. 8d, 8e and 8f shows formation of the interface ring 13 and pulse ring 17 and are more fully described in FIGS. 9a, 9b, and 9c.

Figure 8G:
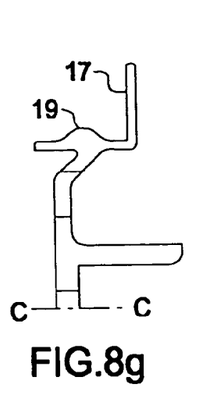

FIG. 8g shows machining performed on the formed surfaces as known the art. The rubber interface surface 19 is machined for proper engagement with the elastomeric member 14. A predetermined surface finish may also be applied by known processes, such as by painting or coating with epoxy.

Figure 8H:
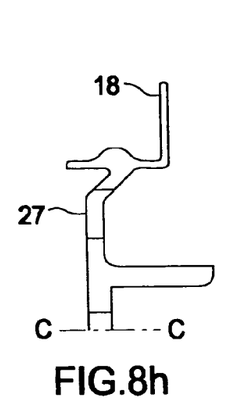

FIG. 8h shows the piercing step. Teeth 18 and web openings 27, see FIG. 3, are formed by piercing. Piercing includes any known stamping process by which metal is removed from the inner hub 110 to from web openings 27 and from the pulse ring 17 to form teeth 18. Teeth 18 may also be spun formed in a known fashion.

Figure 8I:
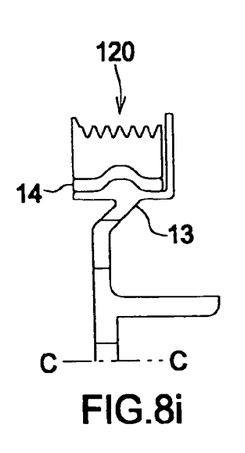

FIG. 8i shows outer ring 120 engaged to interface ring 13 with the connecting member elastomeric ring 14. In this step outer ring 120 and inner hub 110 are held in relative fixed positions. Member 14 is then pressed between ring 120 and hub 110. Member 14 is in a somewhat compressed state between the inner hub and outer ring, in a range of approximately >0% to approximately 50%, in order to facilitate engagement between outer ring 120 and inner hub 110. An adhesive may be used in a known fashion to secure member 14 between the inner hub 110 and outer ring 120.

Figure 8J:
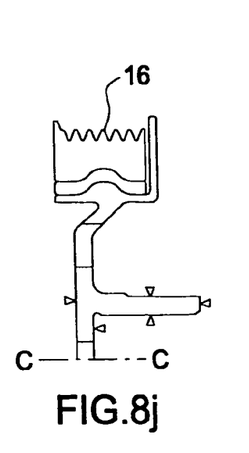

FIG. 8j shows a final machining step to complete the center hub 10 in a fashion known in the art. This may include application of a suitable surface finish by machining or by painting.

FIGS. 9a, 9b, 9c are half cross-sectional views of a fabrication process. Damper blank 2000 shown in FIG. 8c is clamped between rotating mandrel sections M3 and M4. The form shown in FIG. 8c is then further formed by roller R5 having forming profile RP5 moving substantially radially inward in direction DR6 to form a radius portion 2002 of blank 2000. Arcuate radius portion 2002 is formed against mandrel section M4 by action of roller R5. Radius portion 2002 is then stretched by roller R5 having rolling profile RP5 moving substantially radially outwardly in direction DR7 to create a rough form of pulse ring 17. Referring to FIG. 9b, roller R5 moving in direction DR8 further completes pulse ring 17 and the rough shape 2003 of the interface ring 13 against mandrel sections MR3 and M4. In FIG. 9c, roller R6 with rolling profile RP6 moves substantially radially inward in direction DR9 to further flatten pulse ring 17 and to give final form to interface ring 13, and in particular surface 19, see FIG. 8g.

In this alternate embodiment offset 2001 engages interface ring at a position that is substantially centered upon and radially aligned with a belt bearing surface, 16 and 26, see FIGS. 1, 2, 8i and 8j. This serves to illustrate the versatility available with this method for positioning a belt bearing surface relative to a damper web. This in turn allows a user to design a flow formed damper to optimize use of available space in an engine compartment.

Although a single form of the invention has been described herein, it will be obvious to those skilled in the art that variations may be made in the construction and relation of parts without departing from the spirit and scope of the invention described herein.

We claim:

1. A method of forming a crankshaft damper comprising:
    forming a first ring by spinning a first annular disc supported in a rotating mandrel, moving a first roller radially inwardly against a side of the first disc displacing a portion of the first disc inwardly against a mandrel to form a hub, pressing a second roller radially inwardly against a first annular disc edge whereby a gathered portion of the first annular disc is formed, splitting the gathered portion by inward radial movement of a roller while simultaneously forming a lobe from the gathered portion, stretching the lobe in a radial direction by outward radial movement of a second roller while simultaneously supporting a portion of the gathered portion, thereby simultaneously forming a radially extending member substantially normal to an axis of rotation of the first ring;
    forming a plurality of tabs extending about a perimeter of the radially extending member;
    forming a second ring by spinning a second annular disc supported in a rotating mandrel, moving a first roller radially inwardly against a second annular disc edge whereby a gathered portion of the second annular disc is formed, pressing a roller having a profile against the gathered material whereby a profile is formed in a second ring outer surface; and
    connecting the first ring to the second ring by engaging a flexible connecting member between the first ring and the second ring.

2. The method as in claim 1, wherein the connecting member comprises an elastomeric material.

3. The method as in claim 1 further comprising forming a profile in the first ring outer surface and forming a profile in the second ring inner surface to cooperate with the first ring outer surface profile.

4. The method as in claim 1, comprising forming a multi-ribbed profile in the second ring outer surface.

5. The method as in claim 1 comprising stamping the radially extending member to form the tabs.

6. The method as in claim 1 comprising forming a gap in the tabs.

* * * * *